US012087024B2

(12) United States Patent
Djelouah et al.

(10) Patent No.: US 12,087,024 B2
(45) Date of Patent: Sep. 10, 2024

(54) IMAGE COMPRESSION USING NORMALIZING FLOWS

(71) Applicants: Disney Enterprises, Inc., Burbank, CA (US); ETH ZÜRICH, Zürich (CH)

(72) Inventors: Abdelaziz Djelouah, Zürich (CH); Leonhard Markus Helminger, Zürich (CH); Scott Labrozzi, Cary, NC (US); Yuanyi Xue, Kensington, CA (US); Erika Varis Doggett, Los Angeles, CA (US); Jared McPhillen, Glendale, CA (US); Christopher Richard Schroers, Zürich (CH)

(73) Assignees: Disney Enterprises, Inc., Burbank, CA (US); ETH Zurich, Zurich (CH)

( * ) Notice: Subject to any disclaimer, the term of this patent is extended or adjusted under 35 U.S.C. 154(b) by 38 days.

(21) Appl. No.: 16/811,219

(22) Filed: Mar. 6, 2020

(65) Prior Publication Data

US 2021/0142524 A1 May 13, 2021

Related U.S. Application Data

(60) Provisional application No. 62/935,018, filed on Nov. 13, 2019.

(51) Int. Cl.
*H04N 19/60* (2014.01)
*G06T 9/00* (2006.01)
(Continued)

(52) U.S. Cl.
CPC ............ *G06T 9/002* (2013.01); *H04N 19/126* (2014.11); *H04N 19/60* (2014.11); *H04N 19/91* (2014.11)

(58) Field of Classification Search
None
See application file for complete search history.

(56) References Cited

U.S. PATENT DOCUMENTS

2005/0031034 A1 2/2005 Kamaci et al.
2008/0112632 A1 5/2008 Vos et al.
(Continued)

FOREIGN PATENT DOCUMENTS

WO WO 2019/155064 A1 8/2019

OTHER PUBLICATIONS

Zhou et al., Multi-scale and Context-adaptive Entropy Model for Image Compression (Year: 2019).*
(Continued)

*Primary Examiner* — Samuel D Fereja
(74) *Attorney, Agent, or Firm* — Farjami & Farjami LLP

(57) ABSTRACT

According to one implementation, an image compression system includes a computing platform having a hardware processor and a system memory storing a software code. The hardware processor executes the software code to receive an input image, transform the input image to a latent space representation of the input image, and quantize the latent space representation of the input image to produce multiple quantized latents. The hardware processor further executes the software code to encode the quantized latents using a probability density function of the latent space representation of the input image, to generate a bitstream, and convert the bitstream into an output image corresponding to the input image. The probability density function of the latent space representation of the input image is obtained based on a normalizing flow mapping of one of the input image or the latent space representation of the input image.

16 Claims, 5 Drawing Sheets

(51) Int. Cl.
  *H04N 19/126*  (2014.01)
  *H04N 19/91*   (2014.01)

(56) References Cited

U.S. PATENT DOCUMENTS

2020/0160176 A1* 5/2020 Mehrasa ............... G06N 3/047
2020/0304147 A1* 9/2020 Choi .................... H03M 7/6011
2021/0019619 A1* 1/2021 Bhattacharyya ....... G06N 3/047

OTHER PUBLICATIONS

Extended European Search Report in EP Application Serial No. 20198064.6, dated Mar. 15, 2021.
"Glow: Generative Flow with Invertible 1×1 Convolutions" by Kingma et al. (OpenAI 2018).
"Multi-scale and Context-adaptive Entropy Model for Image Compression" by Zhou et al. (Cornell University 2019).
"Variational Image Compression with a Scale Hyperprior" by Ballé et al. (ICLR 2018).
"Variable Rate Image Compression With Recurrent Neural Networks" by Toderici et al. (ICLR 2016).
"Variational Inference with Normalizing Flows" by Danilo Jimenez Rezende and Shakir Mohamed. (JLMR 2015).
"Joint Autoregressive and Hierarchical Priors for Learned Image Compression" by David Minnen, Johannes Ballé, and George Toderici. (NIPS 2018).
"Conditional Probability Models for Deep Image Compression" by Mentzer et al. (2019).
"TESTIMAGES: a large-scale archive for testing visual devices and basic image processing algorithms" by N. Asuni and A. Giachetti. (STAG 2014).
"Practical Full Resolution Learned Lossless Image Compression" by Mentzer. (CVPR 2019).
"Real-Time Adaptive Image Compression" by Oren Rippel and Lubomir Bourdev. (JMLR 2017).
"Variable Rate Deep Image Compression With a Conditional Autoencoder" by Choi et al. (ICCV 2019).
"End-To-End Optimized Image Compression" by Johannes Ballé, Valero Laparra, and Eero P. Simoncelli. (ICLR 2017).
"Microsoft COCO: Common Objects in Context" by Lin et al. (ECCV 2014).
"DVC: An End-to-end Deep Video Compression Framework" by Lu et al. (CVPR 2019).
"Glow: Generative Flow with Invertible lxl Convolutions" by Diederik P. Kingma and Prafulla Dhariwal. (NIPS 2018).
"Integer Discrete Flows and Lossless Compression" by Hoogeboom et al. (NIPS 2019).
"A Downsampled Variant of Imagenet as an Alternative To the Cifar Datasets" by Patryk Chrabaszcz, Ilya Loshchilov and Frank Hutter. (2017).
"Generative Adversarial Networks for Extreme Learned Image Compression" by Agustsson et al. (ICCV 2019).
"Full Resolution Image Compression with Recurrent Neural Networks" by Toderici et al. (CVPR 2017).

* cited by examiner

IMAGE COMPRESSION USING NORMALIZING FLOWS

RELATED APPLICATION(S)

The present application claims the benefit of and priority to a pending Provisional Patent Application Ser. No. 62/935,018, filed Nov. 13, 2019, and titled "Normalizing Flow in Image Compression," which is hereby incorporated fully by reference into the present application.

BACKGROUND

The field of neural image compression has made significant progress with deep learning based approaches. There are two key aspects in neural based image compression. First a mapping from image space to a latent space must be learned. Second, a probability needs to be learned in this new space to allow entropy coding of the latents.

Conventional approaches have addressed the first aspect by proposing neural network architectures to parameterize the encoding and decoding functions typically needed to achieve good compression results. More recently, the primary focus of research has been on the second aspect: trying to accurately model the distribution in the latent space, where there remains a need in the art for additional progress.

SUMMARY

There are provided systems and methods for performing image compression using normalizing flows, substantially as shown in and/or described in connection with at least one of the figures, and as set forth more completely in the claims.

DETAILED DESCRIPTION

Figure 1:
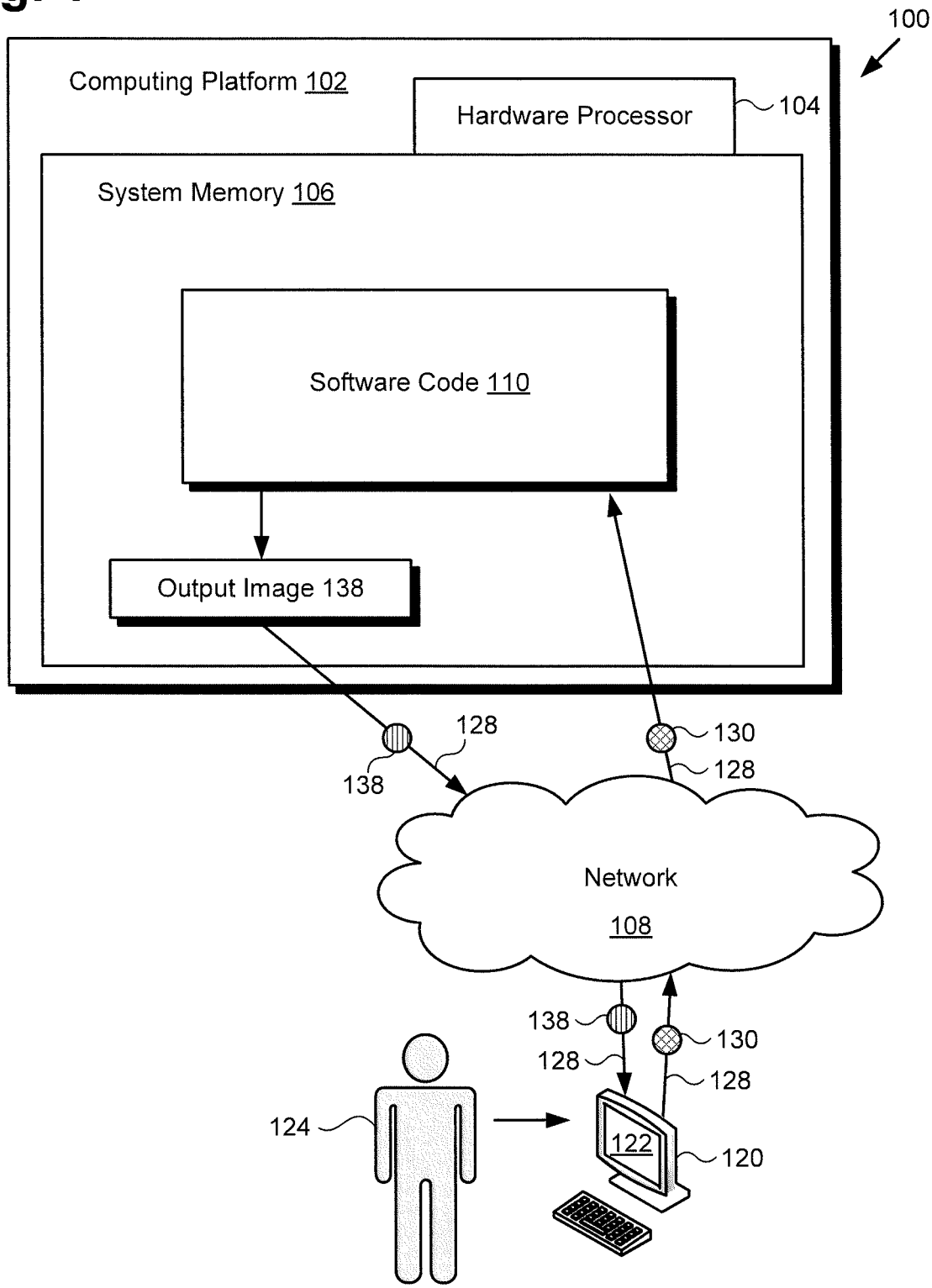
FIG. 1 shows a diagram of an exemplary system for performing image compression using normalizing flows, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing image compression using normalizing flows that overcome the drawbacks and deficiencies in the conventional art. It is noted that, in some implementations, the methods disclosed by the present application may be performed as substantially automated processes by substantially automated systems. It is further noted that, as used in the present application, the terms "automation," "automated", and "automating" refer to systems and processes that do not require the participation of a human user, such as a system operator. Although, in some implementations, a human system operator or administrator may review the performance of the automated systems described herein, that human involvement is optional. Thus, the methods described in the present application may be performed under the control of hardware processing components of the disclosed automated systems.

Moreover, as defined in the present application, an artificial neural network, also known simply as a neural network (hereinafter "NN"), is a type of machine learning framework in which patterns or learned representations of observed data are processed using highly connected computational layers that map the relationship between inputs and outputs. A "deep neural network," in the context of deep learning, may refer to a neural network that utilizes multiple hidden layers between input and output layers, which may allow for learning based on features not explicitly defined in raw data. As used in the present application, a feature labeled as an NN refers to a deep neural network. Various forms of NNs, such as convolutional NNs (hereinafter "CNNs") including layers that apply a convolution operation to an input to the CNN, may be used to make predictions about new data based on past examples or "training data." In various implementations, NNs may be utilized to perform image processing or natural-language processing.

FIG. 1 shows a diagram of an exemplary system for performing image compression using normalizing flows, according to one implementation. As discussed below, image compression system 100 may be implemented using a computer server accessible over a local area network (LAN) or may be implemented as cloud-based system. As shown in FIG. 1, image compression system 100 includes computing platform 102 having hardware processor 104, and system memory 106 implemented as a non-transitory storage device. According to the present exemplary implementation, system memory 106 stores software code 110.

As further shown in FIG. 1, image compression system 100 is implemented within a use environment including communication network 108 and user system 120 including display 122 configured to be utilized by a user 124. Also shown in FIG. 1 are network communication links 128 interactively connecting user system 120 and image compression system 100 via communication network 108, input image 130, and output image 138 corresponding to input image 130 and produced using software code 110.

It is noted that, although the present application refers to software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts software code 110 as being stored in its entirety in system memory 106, that representation is also provided merely as an aid to conceptual clarity. More generally, image compression system 100 may include one or more computing platforms 102, such as computer servers for example, which may be co-located, or may form an interactively linked but distributed system, such as a cloud-based system, for instance.

As a result, hardware processor 104 and system memory 106 may correspond to distributed processor and memory resources within image compression system 100. Thus, it is to be understood that various features of software code 110, such as one or more of the features described below by reference to FIGS. 2, 4, and 5, may be stored and/or executed using the distributed memory and/or processor resources of image compression system 100.

According to the implementation shown by FIG. 1, user 124 may utilize user system 120 to interact with image compression system 100 over communication network 108. In one such implementation, computing platform 102 may correspond to one or more web servers, accessible over a packet-switched network such as the Internet, for example. Alternatively, computing platform 102 may correspond to one or more computer servers supporting a wide area network (WAN), a LAN, or included in another type of limited distribution or private network.

Although user system 120 is shown as a desktop computer in FIG. 1, that representation is also provided merely as an example. More generally, user system 120 may be any suitable mobile or stationary computing device or system that implements data processing capabilities sufficient to provide a user interface, support connections to communication network 108, and implement the functionality ascribed to user system 120 herein. For example, in other implementations, user system 120 may take the form of a laptop computer, tablet computer, or smartphone, for example. User 124 may utilize user system 120 to interact with image compression system 100 to use software code 110, executed by hardware processor 104, to produce output image 138 corresponding to input image 130.

It is noted that, in various implementations, output image 138, when generated using software code 110, may be stored in system memory 106 and/or may be copied to non-volatile storage. Alternatively, or in addition, as shown in FIG. 1, in some implementations, output image 138 may be sent to user system 120 including display 122, for example by being transferred via network communication links 128 of communication network 108.

With respect to display 122 of user system 120, display 122 may be physically integrated with user system 120 or may be communicatively coupled to but physically separate from user system 120. For example, where user system 120 is implemented as a smartphone, laptop computer, or tablet computer, display 122 will typically be integrated with user system 120. By contrast, where user system 120 is implemented as a desktop computer, display 122 may take the form of a monitor separate from user system 120 in the form of a computer tower. Moreover, display 122 may be implemented as a liquid crystal display (LCD), a light-emitting diode (LED) display, an organic light-emitting diode (OLED) display, or any other suitable display screen that performs a physical transformation of signals to light.

By way of overview, the objective of lossy image compression is to find a mapping or encoding function $\psi: X \rightarrow \mathcal{Y}$ from the image space X to a latent space representation $\mathcal{Y}$ and its reverse mapping or decoding function $\phi: \mathcal{Y} \rightarrow X$ back to the original image space. Such a mapping and reverse mapping is performed with the competing constraints that, on the one hand, the latent representation should occupy as little storage as possible while, on the other hand, the reconstructed image, i.e., output image 138, should closely resemble the original image, i.e., input image 130.

In neural image compression, this mapping is realized with a neural encoder-decoder pair, where the bottleneck values constitute the latent representation. An image x is first mapped to its latent representation $y=\psi(x)$. After quantization, the resulting quantized latents $\hat{y}$ are coded losslessly to a bit stream that can be decoded into the image $\hat{x}=\phi(\hat{y})$.

Image compression can be formally expressed as the minimization of the expected length of the bitstream, as well as the minimization of the expected distortion of output image 138 compared to input image 130, which leads to the optimization of the following rate-distortion trade-off:

$$L(\psi, \phi, p_{\hat{y}}) = \mathbb{E}_{x \sim p_x}\left[\underbrace{-\log_2 p_{\hat{y}}(\hat{y})}_{\text{rate}} + \lambda \underbrace{d(x, \hat{x})}_{\text{distortion}}\right]. \quad \text{(Equation 1)}$$

Here, $\mathbb{E}_{x \sim p_x}$ is the expectation for the image x over the unknown distribution of natural images $p_x$, and $d(x, \hat{x})$ is the distortion measure, which, merely as an example, may be expressed as the mean squared error. The rate term in Equation 1 corresponds to the length of the bitstream needed to encode the quantized representation $\hat{y}$, based on a learned entropy model over the unknown distribution of natural images $p_x$. The weight $\lambda$ steers the rate distortion trade-off, e.g., reducing $\lambda$ leads to a higher compression rate at the cost of a larger distortion of output image 138.

As noted above, two main problems arise when performing neural image compression with a large distribution of images: First, finding a powerful encoder/decoder transformation and second, properly modeling the distribution in the latent space. As also noted above, conventional approaches have made contributions to the first problem by proposing neural network architectures to parameterize the encoding and decoding functions. The present novel and inventive approach, utilizes the advantages provided by normalizing flows to address the challenges posed by both problems.

A normalizing flow refers to the transformation of a probability density as the result of a series of invertible mappings, such as bijective mappings, for example. In normalizing flow the objective is to map a simple distribution to a more complex one. This is done through a change of variable. For exemplary purposes, considering two random variables Y and Z that are related through the invertible transformation $f: \mathbb{R}^d \rightarrow \mathbb{R}^d$, then $$p_Y(y) = p_Z(f(z))\left|\det\left(\frac{\partial f(x)}{\partial x}\right)\right|. \quad \text{(Equation 2)}$$

In normalizing flow, a series $f_K, \ldots, f_1$ of such mapping is applied. Applying this on an initial distribution $$z_K = f_K \circ \ldots \circ f_1(z_0) \quad \text{(Equation 3)}$$

can transform a simple probability distribution into a more complex multi-modal distribution:

$$p_K(z_K) = p_0(z_0) \prod_{k=1}^{K} \left| \det\left(\frac{\partial f_k}{\partial z_{k-1}}\right) \right|^{-1}. \quad \text{(Equation 4)}$$

Figure 2:
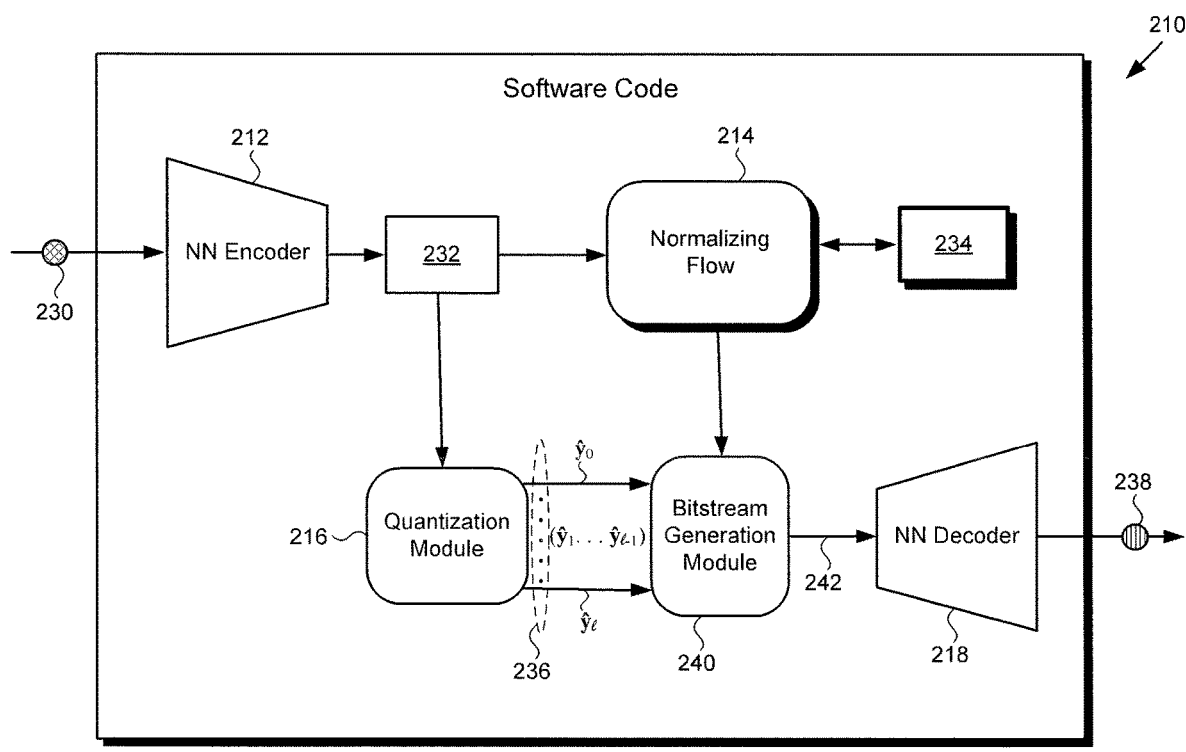
FIG. 2 shows an exemplary diagram of a software code suitable for execution by a hardware processor of the image compression system in FIG. 1, according to one implementation.

Referring now to FIG. 2, FIG. 2 shows exemplary software code 210 suitable for execution by hardware processor 104 of image compression system 100, in FIG. 1, according to one implementation. As shown in FIG. 2, software code 210 includes NN encoder 212 configured to transform input image 230 to latent space representation 232 of input image 230, and normalizing flow 214 configured to produce normalizing flow mapping 234 of latent space representation 232.

Software code 210 also includes quantization module 216 configured to quantize latent space representation 232. As known in the art, the term "quantization" refers to transforming continuous values into a discrete set of values before entropy coding. Quantization is generally done by dividing the original values by some quantization step and then rounding the result. The larger the quantization step the more information is lost. Quantization module 216 quantizes latent space representation 232 to produce multiple quantized latents 236, which are then entropy encoded by bitstream generation module 240 using a probability density function of latent space representation 232 obtained based on normalizing flow mapping 234, to produce bitstream 242. In addition, software code 210 includes NN decoder 218 configured to receive bitstream 242 and to produce output image 238 corresponding to input image 230.

Input image 230 and output image 238 correspond respectively in general to input image 130 and output image 138, in FIG. 1, and those features may share any of the characteristics attributed to either corresponding feature by the present disclosure. In addition, software code 210 corresponds in general to software code 110, and those features may share the characteristics attributed to either corresponding feature by the present disclosure. That is to say, like software code 210, software code 110 may include NN encoder 212, normalizing flow 214, quantization module 216, bitstream generation module 240, and NN decoder 218.

It is noted that, that in some implementations, it may be advantageous or desirable for NN encoder 212 and NN decoder 218 to take the form of CNNs. It is further noted that normalizing flow 214 is depicted conceptually because the specific architecture of normalizing flow 214 may vary, and in some implementations, may include several hierarchical levels. Moreover, it is also noted that normalizing flow mapping 234 performed by normalizing flow 214 may be a bijective mapping of latent space representation 232 of input image 130/230.

Figure 3:
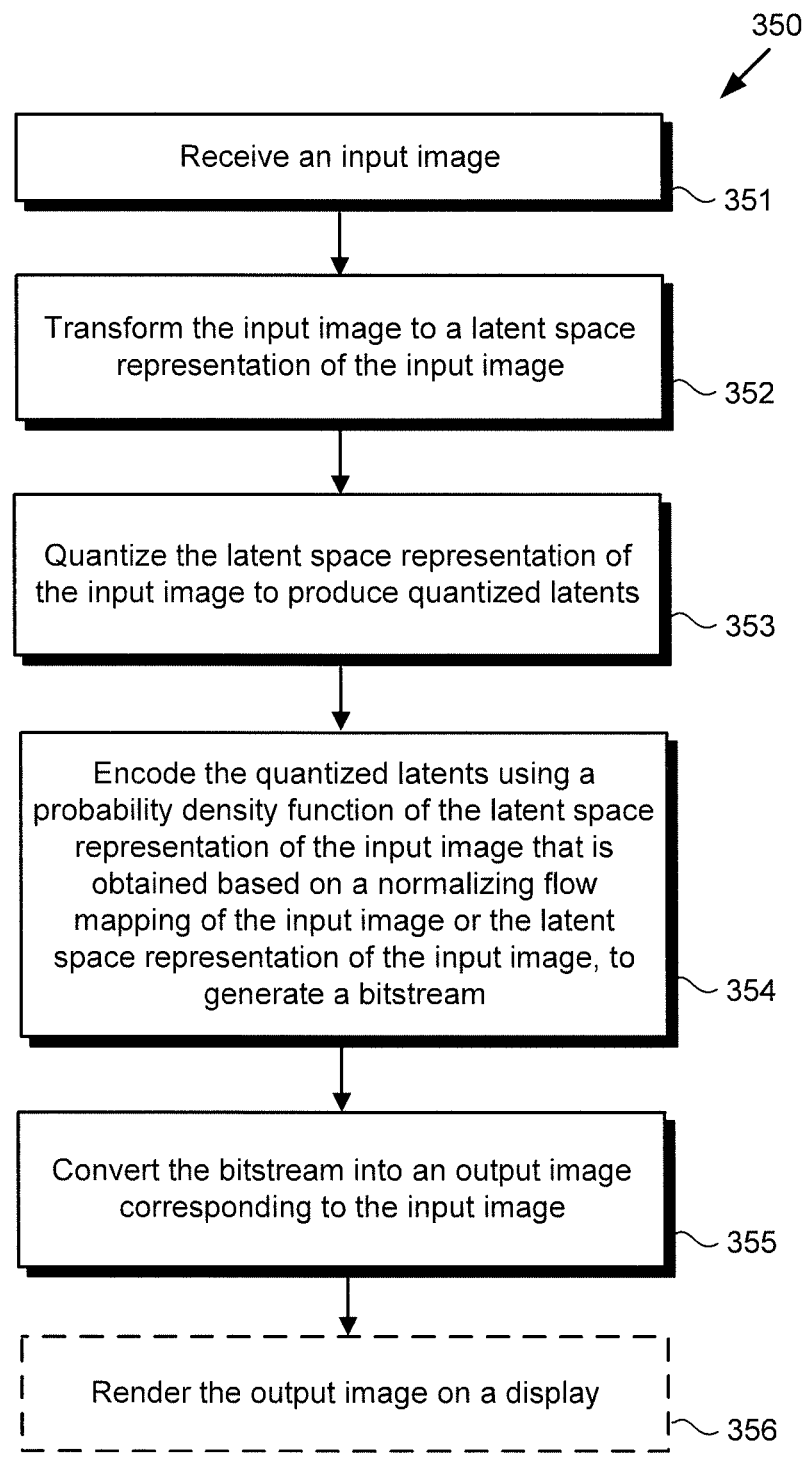
FIG. 3 shows a flowchart presenting an exemplary method for performing image compression using normalizing flows, according to one implementation

The functionality of software code 110/210 will be further described by reference to FIG. 3 in combination with FIGS. 1 and 2. FIG. 3 shows flowchart 350 presenting an exemplary method for performing image compression using normalizing flows, according to one implementation. With respect to the method outlined in FIG. 3, it is noted that certain details and features have been left out of flowchart 350 in order not to obscure the discussion of the inventive features in the present application.

Referring now to FIG. 3 in combination with FIGS. 1 and 2, flowchart 350 begins with receiving input image 130/230 (action 351). By way of example, user 124 may utilize user system 120 to interact with image compression system 100 in order to produce output image 138/238 corresponding to input image 130/230, which may be a digital photograph or one or more video frames, for instance. As shown by FIG. 1, in one implementation, user 124 may transmit input image 130/230 from user system 120 to image compression system 100 via communication network 108 and network communication links 128. Alternatively, input image 130/230 may be received from a third party source, or may be stored in system memory 106. Input image 130/230 may be received by NN encoder 212 of software code 110/210, executed by hardware processor 104.

Flowchart 350 continues with transforming input image 130/230 to latent space representation 232 of input image 130/230 (action 352). According to the exemplary implementation shown in FIG. 2, the transformation of input image 130/230 to latent space representation 232 of input image 130/230 may be performed by NN encoder 212 of software code 110/210, executed by hardware processor 104, and using any neural encoding techniques known in the art.

Flowchart 350 continues with quantizing latent space representation 232 of input image 130/230 to produce quantized latents 236 (action 353). The quantization of latent space representation 232 of input image 130/230 to produce quantized latents 236 may be performed by quantization module 216 of software code 110/210, executed by hardware processor 104. The quantization of latent space representation 232 in action 353 may be performed using any one of several known quantization techniques. For example, in one implementation, quantization may be performed using simple rounding. It is emphasized that the quantization performed in action 353 is performed on latent space representation 232 that is provided as an output by NN encoder 212 directly to quantization module 216.

According to the exemplary implementation shown by FIG. 2, flowchart 350 continues with encoding quantized latents 236 using a probability density function of latent space representation 232 of input image 130/230 that is obtained based on normalizing flow mapping 234 of latent space representation 232 of input image 130/230, to generate bitstream 242 (action 354). Quantized latents 236 may be entropy encoded by bitstream generation module 240 of software code 110/210, for example, executed by hardware processor 104.

As normalizing flow permits the mapping of a simple probability distribution into a more complex one according to Equation 4, above, the present method utilizes normalizing flow mapping 234 to model the probability distribution of image compression latents ŷ in Equation 1, also above. Normalizing flow 214 is used to map the latents y of latent space representation 232 into normalizing flow mapping 234 that has a simple probability density distribution as the result being constrained. That is to say, normalizing flow mapping 234 of latent space representation 232 of input image 130/230 maps latent space representation 232 onto a constrained probability density distribution. For example, in one implementation, the probability density distribution of normalizing flow mapping 234 may be constrained to be Gaussian, although other distributions having other constraints may be used instead of a Gaussian distribution. The normalizing flow 214 is trained to minimize the rate distortion loss term in Equation 1 on a dataset of images.

Normalizing flow mapping 234 makes it possible to obtain an estimate of the probability density function for any latent y, which can be used for entropy coding of quantized latents 236 by bitstream generation module 240. The probability density function for latent space representation 232 must typically be estimated for each of quantized latents 236 individually. By way of example, independently encoding each dimension (or channel) of the latents y is considered. The probability for each integer value "α" can be expressed as $$P(\alpha-\Delta 1 \leq y_c < \alpha+\Delta 2) = \int_{\alpha-\Delta 1}^{\alpha+\Delta 2} p(y_c) dy_c, \quad \text{(Equation 5)}$$

which can be estimated using Equation 4. It is noted that when quantization is performed using simple rounding, $\Delta 1 = \Delta 2$. For example, in one implementation, the value 0.5 may be substituted for each of $\Delta 1$ and $\Delta 2$ in Equation 5. That is to say, in one implementation, $\Delta 1 = \Delta 2 = 0.5$ in Equation 5.

In some implementations, flowchart 350 can conclude with converting bitstream 242 into output image 138/238 corresponding to input image 130/230 (action 355). According to the exemplary implementation shown in FIG. 2, the conversion of bitstream 242 into output image 138/238 may be performed by NN decoder 218 of software code 110/210, executed by hardware processor 104, and using any neural decoding techniques known in the art. It is noted that optional action 356 shown in FIG. 3 is discussed below after the alternative implementations of software code 110 shown by FIG. 4 and FIG. 5 are described.

Figure 4:
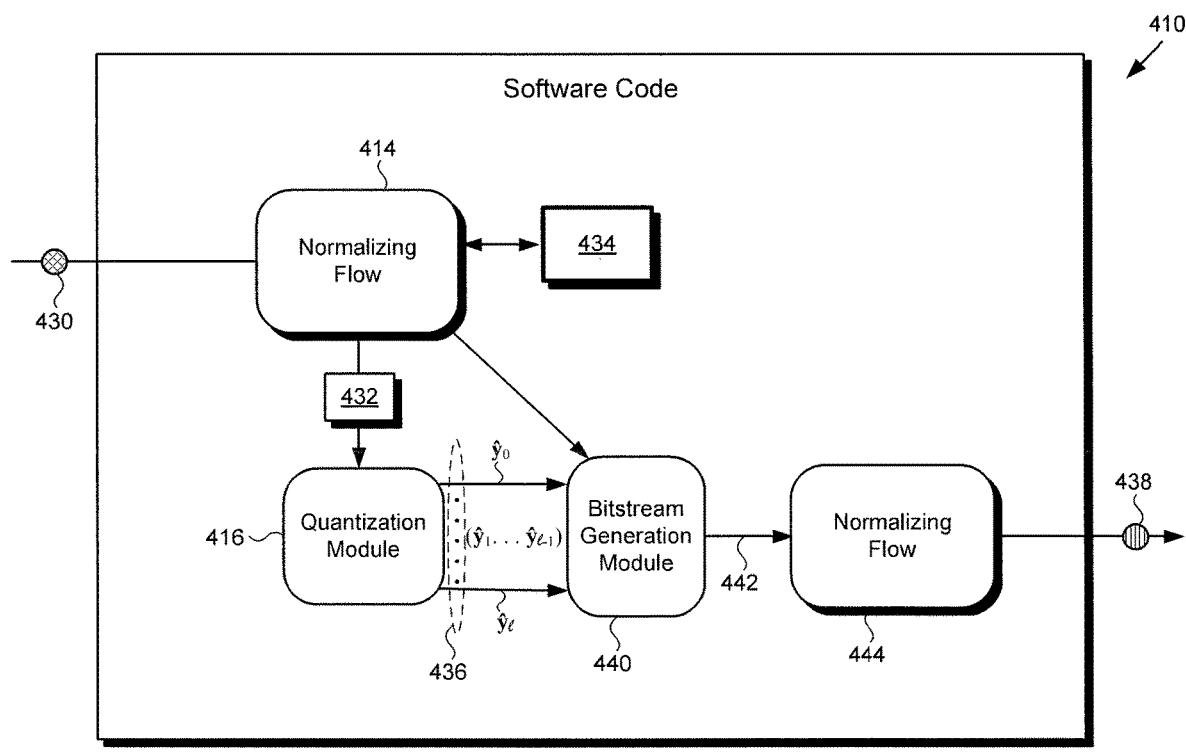
FIG. 4 shows an exemplary diagram of a software code suitable for execution by a hardware processor of the image compression system in FIG. 1, according to another implementation.
Figure 5:
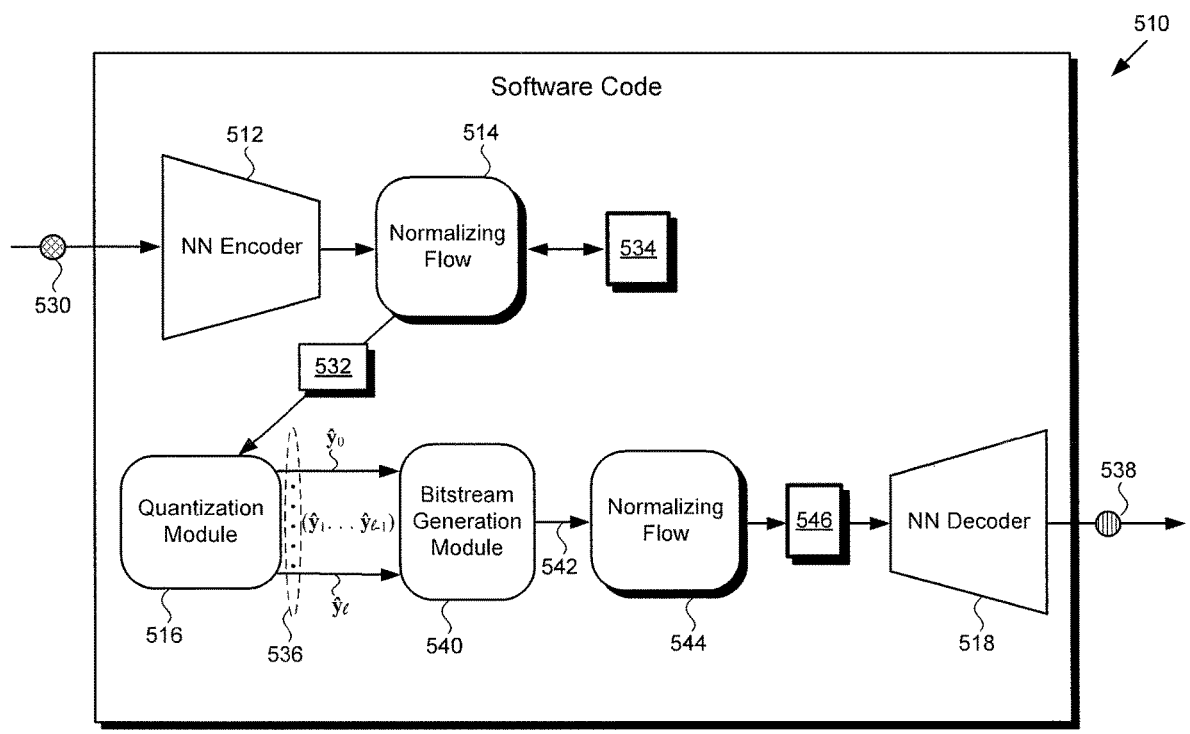
FIG. 5 shows an exemplary diagram of a software code suitable for execution by a hardware processor of the image compression system in FIG. 1, according to yet another implementation.

FIG. 4 shows exemplary software code 410 suitable for execution by hardware processor 104 of image compression system 100, in FIG. 1, according to another implementation. As shown in FIG. 4, software code 410 includes first normalizing flow 414 configured to transform input image 430 to latent space representation 432 of input image 430. Software code 410 also includes quantization module 416 configured to quantize latent space representation 432 to produce multiple quantized latents 436, which are then entropy encoded by bitstream generation module 440 using a probability density function of latent space representation 432 obtained based on first normalizing flow mapping 434 to produce bitstream 442. In addition, software code 410 includes second normalizing flow 444 configured to receive bitstream 442 and to perform a second normalizing flow mapping on bitstream 442 to produce output image 438 corresponding to input image 430.

Input image 430 and output image 438 correspond respectively in general to input image 130 and output image 138, in FIG. 1, and those features may share any of the characteristics attributed to either corresponding feature by the present disclosure. In addition, software code 410 corresponds in general to software code 110, and those features may share the characteristics attributed to either corresponding feature by the present disclosure. That is to say, like software code 410, software code 110 may include first normalizing flow 414, quantization module 416, bitstream generation module 440, and second normalizing flow 444.

It is noted that first normalizing flow 414 and second normalizing flow 444 are depicted conceptually because the specific architectures of first and second normalizing flows 414 and 444 may vary, and in some implementations, may include several hierarchical levels. It is further noted that first normalizing flow mapping 434 performed by first normalizing flow 414 may be a bijective mapping of latent space representation 432 of input image 130/430.

Referring now to the method outlined by flowchart 350 with further reference to the exemplary implementation of software code 410 shown in FIG. 4, flowchart 350 begins with receiving input image 130/430 (action 351). As noted above, user 124 may utilize user system 120 to interact with image compression system 100 in order to produce output image 138/438 corresponding to input image 130/430, which may be a digital photograph or one or more video frames, for instance. As shown by FIG. 1, in one implementation, user 124 may transmit input image 130/430 from user system 120 to image compression system 100 via communication network 108 and network communication links 128. Alternatively, input image 130/430 may be received from a third party source, or may be stored in system memory 106. Input image 130/430 may be received by first normalizing flow 414 of software code 110/410, executed by hardware processor 104.

Flowchart 350 continues with transforming input image 130/430 to latent space representation 432 of input image 130/430 (action 352). According to the exemplary implementation shown in FIG. 4, the transformation of input image 130/430 to latent space representation 432 of input image 130/430 may be performed by first normalizing flow 414 of software code 110/410, executed by hardware processor 104, and using first normalizing flow mapping 434 of input image 130/430.

As shown by comparison of FIG. 2 and FIG. 4, another approach for image compression is to utilize normalizing flows as direct alternatives to autoencoders, i.e., NN encoder 212 and NN decoder 218, in FIG. 2. The training criterion for normalizing flow based generative models is simply the negative log likelihood over the training dataset D:

$$L(\mathcal{D}) = -\frac{1}{|\mathcal{D}|} \sum_{x \in \mathcal{D}} \log p(x). \quad \text{(Equation 6)}$$

In order to be compatible with image compression, a modified training that is adapted to take into account the quantization of the latents is utilized. The architecture of first normalizing flow 414 may be hierarchical to allow a coarse to fine encoding. It is noted that first normalizing flow 414 is trained to minimize the rate distortion loss term in Equation 1 on a dataset of images.

Flowchart 350 continues with quantizing latent space representation 432 of input image 130/430 to produce quantized latents 436 (action 353). The quantization of latent space representation 432 of input image 130/430 to produce quantized latents 436 may be performed by quantization module 416 of software code 110/410, executed by hardware processor 104. The quantization of latent space representation 432 in action 453 may be performed using any one of several known quantization techniques. For example, in one implementation, quantization may be performed using simple rounding. It is emphasized that, according to the implementation shown in FIG. 4, the quantization performed in action 353 is performed on latent space representation 432 of input image 130/430 that is provided as an output by first normalizing flow 414, in contrast to latent space representation 232 provided as an output by NN encoder 212, in FIG. 2.

According to the exemplary implementation shown by FIG. 4, flowchart 350 continues with encoding quantized latents 436 using a probability density function of latent space representation 432 of input image 130/430 that is obtained based on first normalizing flow mapping 434 of input image 130/430, to generate bitstream 442 (action 354). Quantized latents 436 may be entropy encoded by bitstream generation module 440 of software code 110/410, for example, executed by hardware processor 104.

First normalizing flow 414 is used to transform input image 130/430 into latent space representation 432 that has a simple probability density distribution, in action 352, as the result of first normalizing flow mapping 434 being constrained. That is to say, first normalizing flow mapping 434 of latent space representation 432 of input image 130/430 maps latent space representation 432 onto a constrained probability density distribution. For example, in one implementation, the probability density distribution of first normalizing flow mapping 434 may be constrained to be Gaussian, although other distributions having other constraints may be used instead of a Gaussian distribution.

In some implementations, flowchart 350 can conclude with converting bitstream 442 into output image 138/438 corresponding to input image 130/430 (action 355). According to the exemplary implementation shown in FIG. 4, the conversion of bitstream 442 into output image 138/438 may be performed as a normalizing flow mapping by second normalizing flow 444 of software code 110/410, executed by hardware processor 104. As noted above, optional action 356 shown in FIG. 3 is discussed below after the alternative implementation of software code 110 shown by FIG. 5 is described.

FIG. 5 shows exemplary software code 510 suitable for execution by hardware processor 104 of image compression system 100, in FIG. 1, according to yet another implementation. As shown in FIG. 5, software code 510 includes first normalizing flow 514 configured to use the output provided by NN encoder 512 to transform input image 530 to latent space representation 532 of input image 530 based on first normalizing flow mapping 534. Software code 510 also includes quantization module 516 configured to quantize latent space representation 532 to produce multiple quantized latents 536, which are then entropy encoded by bitstream generation module 540 using a probability density function of latent space representation 532 obtained based on first normalizing flow mapping 534, to produce bitstream 542. In addition, software code 510 includes second normalizing flow 544 configured to receive bitstream 542 and to perform a normalizing flow mapping on bitstream 542 to produce second normalizing flow mapping 546, as well as NN decoder 518. It is noted that software code 510 converts bitstream 542 into output image 538 corresponding to input image 530 using NN decoder 518 and second normalizing flow mapping 546 produced by second normalizing flow 544.

Input image 530 and output image 538 correspond respectively in general to input image 130 and output image 138, in FIG. 1, and those features may share any of the characteristics attributed to either corresponding feature by the present disclosure. In addition, software code 510 corresponds in general to software code 110, and those features may share the characteristics attributed to either corresponding feature by the present disclosure. That is to say, like software code 510, software code 110 may include NN encoder 512, first normalizing flow 514, quantization module 516, bitstream generation module 540, second normalizing flow 544, and NN decoder 518.

It is noted that, that in some implementations, it may be advantageous or desirable for NN encoder 512 and NN decoder 518 to take the form of CNNs. It is further noted that first normalizing flow 514 and second normalizing flow 544 are depicted conceptually because the specific architectures of first and second normalizing flows 514 and 544 may vary, and in some implementations, may include several hierarchical levels. Moreover, it is also noted that first normalizing flow mapping 534 performed by first normalizing flow 514 may be a bijective mapping of latent space representation 532 of input image 130/530.

Referring now to the method outlined by flowchart 350 with further reference to the exemplary implementation of software code 510 shown in FIG. 5, flowchart 550 begins with receiving input image 130/530 (action 351). Input image 130/530 may be received by NN encoder 512 of software code 110/510, executed by hardware processor 104.

Flowchart 350 continues with transforming input image 130/530 to latent space representation 532 of input image 130/530 (action 352). According to the exemplary implementation shown in FIG. 5, the transformation of input image 130/530 to latent space representation 532 of input image 130/530 may be performed using first normalized flow mapping 534 of the output of NN encoder 512 by first normalizing flow 514 of software code 110/510, executed by hardware processor 504.

As shown by FIG. 5, yet another approach for image compression is to utilize an autoencoder pair, i.e., NN encoder 512 and NN decoder 518 in combination with first and second normalizing flows 514 and 544. It is noted that use of NN encoder 512 may serve to reduce the dimensionality of input image 130/530 before first normalizing flow 514. Moreover, autoencoders are well understood and at the present time they have more flexibility than normalizing flows, which can be beneficial for image compression.

Flowchart 350 continues with quantizing latent space representation 532 of input image 130/530 to produce quantized latents 536 (action 353). The quantization of latent space representation 532 of input image 130/530 to produce quantized latents 536 may be performed by quantization module 516 of software code 110/510, executed by hardware processor 104. The quantization of latent space representation 532 in action 353 may be performed using any one of several known quantization techniques. For example, in one implementation, quantization may be performed using simple rounding. It is emphasized that, according to the implementation shown in FIG. 5, the quantization performed in action 353 is performed on latent space representation 532 of input image 130/530 provided as an output by first normalizing flow 514, in contrast to latent space representation 232 provided as an output to quantization module 216 by NN encoder 212, in FIG. 2.

According to the exemplary implementation shown by FIG. 5, flowchart 350 continues with encoding quantized latents 536 using a probability density function of latent space representation 532 of input image 130/530 that is obtained based on first normalizing flow mapping 534, to generate bitstream 542 (action 354). Quantized latents 536 may be entropy encoded by bitstream generation module 540 of software code 110/510, for example, executed by hardware processor 104.

First normalizing flow 514 is used to transform the output of NN encoder 512 into latent space representation 532 of input image 130/530 that has a simple probability density distribution, in action 352, as the result of first normalizing flow mapping 534 being constrained. That is to say, first normalizing flow mapping 534 of latent space representation 532 of input image 130/530 maps latent space representation 532 onto a constrained probability density distribution. For example, in one implementation, the probability density distribution of first normalizing flow mapping 534 may be constrained to be Gaussian, although other distributions having other constraints may be used instead of a Gaussian distribution.

Flowchart 350 continues with converting bitstream 542 into output image 138/538 corresponding to input image 130/530 (action 355). According to the exemplary implementation shown in FIG. 5, the conversion of bitstream 542 into output image 138/538 may be performed using normalizing flow mapping 546 of bitstream 542 by second normalizing flow 544, of software code 110/510, executed by hardware processor 104, and using NN decoder 518 of software code 110/510, also executed by hardware processor 104.

As noted above, in some implementations, flowchart 350 can conclude with action 355. However, referring to FIG. 1 in combination with FIG. 3, in other implementations the method outlined by flowchart 350 may continue and conclude with rendering output image 138 on a display, such as display 122 of user system 120 (action 356). As also noted above, display 122 may be implemented as an LCD, LED display, or an OLED display, for example. Moreover, in some implementations display 122 may take the form of a high-definition (HD) display, or an Ultra HD display such as a 4K or 8K resolution display.

In some implementations, user system 120 including display 122 may be integrated with image compression system 100 such that display 122 may be controlled by hardware processor 104 of computing platform 102. In other implementations, as noted above, software code 110 may be stored on a computer-readable non-transitory medium, and may be accessible to the hardware processing resources of user system 120. In those implementations, the rendering of output image 138 on display 122 may be performed by software code 110, executed either by hardware processor 104 of computing platform 102, or by a hardware processor of user system 120.

It is noted that, in some implementations, hardware processor 104 may execute software code 110/210/410/510 to perform actions 351, 352, 353, 354, and 355, or actions 351, 352, 353, 354, 355, and 356, in an automated process from which human involvement may be omitted.

Thus, the present application discloses systems and methods for performing image compression using normalizing flows that overcome the drawbacks and deficiencies in the conventional art. Improvements conferred by the present normalizing flow based image compression solution over the conventional state-of-the-art include a wider range of quality levels than autoencoder based image compression, going from low bitrates to near lossless quality level. In addition, the bijective mappings performed by the normalizing flows disclosed herein cause compressed images to always be mapped to the same point. Consequently, when compressing an image multiple times, the reconstruction quality and the bit rate advantageously remain constant for normalizing flows.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An image compression system comprising:
   a computing platform including a hardware processor and a system memory;
   a software code including a normalizing flow stored in the system memory;
   the hardware processor configured to execute the software code to:
   receive an input image by the normalizing flow;
   transform, by the normalizing flow serving as an alternative to an encoder, the input image to a latent space representation of the input image;
   quantize the latent space representation of the input image to produce a plurality of quantized latents;
   obtain a probability density function of the latent space representation of the input image based on a normalizing flow mapping of the latent space representation of the input image by the normalizing flow;
   generate a bitstream using the plurality of quantized latents and the probability density function of the latent space representation of the input image; and
   convert the bitstream into an output image corresponding to the input image.

2. The image compression system of claim 1, wherein the software code further includes a NN decoder, and wherein the hardware processor is further configured to execute the software code to utilize the NN decoder to convert the bitstream into the output image.

3. The image compression system of claim 1, wherein the normalizing flow is a first normalizing flow, and wherein the hardware processor is further configured to execute the software code to produce, by a second normalizing flow included in the software code, the output image from the bitstream.

4. The image compression system of claim 1, wherein the normalizing flow mapping of the latent space representation of the input image is configured to map the latent space representation of the input image onto a constrained probability density distribution.

5. The image compression system of claim 4, wherein the constrained probability density distribution comprises a Gaussian distribution.

6. The image compression system of claim 1, wherein the normalizing flow mapping comprises a bijective mapping.

7. A method for use by an image compression system including a computing platform having a hardware processor and a system memory storing a software code including a normalizing flow, the method comprising:
   receiving, by the normalizing flow of the software code, executed by the hardware processor, an input image;
   transforming, by the software code executed by the hardware processor, the input image to a latent space representation of the input image using the normalizing flow serving as an alternative to an encoder;
   quantizing, by the software code executed by the hardware processor, the latent space representation of the input image to produce a plurality of quantized latents;
   obtaining, by the software code executed by the hardware processor, a probability density function of the latent space representation of the input image based on a normalizing flow mapping of the latent space representation of the input image by the normalizing flow;
   generating a bitstream, by the software code executed by the hardware processor, using the plurality of quantized latents and the probability density function of the latent space representation of the input image; and
   converting, by the software code executed by the hardware processor, the bitstream into an output image corresponding to the input image.

8. The method of claim 7, wherein the software code further includes an NN decoder, and wherein converting the bitstream into the output image utilizes the NN decoder.

9. The method of claim 7, wherein the normalizing flow-is a first normalizing flow, and wherein the method further comprises producing, by a second normalizing flow of the software code, executed by the hardware processor, the output image from the bitstream.

10. The method of claim 7, wherein the normalizing flow mapping of the latent space representation of the input image maps the latent space representation of the input image onto a constrained probability density distribution.

11. The method of claim 7, wherein the normalizing flow mapping comprises a bijective mapping.

12. An image compression system comprising:
a computing platform including a hardware processor and a system memory;
a software code stored in the system memory;
the hardware processor configured to execute the software code to:
 receive an input image;
 transform the input image to a latent space representation of the input image using a first normalizing flow;
 quantize the latent space representation of the input image to produce a plurality of quantized latents;
 obtain a probability density function of the latent space representation of the input image based on a first normalizing flow mapping of the latent space representation of the input image by the first normalizing flow;
 encode the plurality of quantized latents using the probability density function of the latent space representation of the input image, to generate a bitstream; and
 convert the bitstream into an output image corresponding to the input image using a second normalizing flow.

13. The image compression system of claim 12, wherein the software code includes a neural network (NN) encoder configured to receive the input image, and wherein the hardware processor is further configured to execute the software code to utilize the first normalizing flow to transform an output of the NN encoder to the latent space representation of the input image.

14. The image compression system of claim 12, wherein the first normalizing flow mapping is configured to map the latent space representation of the input image onto a constrained probability density distribution.

15. The image compression system of claim 14, wherein the constrained probability density distribution comprises a Gaussian distribution.

16. The image compression system of claim 12, wherein the first normalizing flow mapping comprises a bijective mapping.

* * * * *